United States Patent [19]

Thomas

[11] Patent Number: 5,101,878
[45] Date of Patent: Apr. 7, 1992

[54] DEPLOYABLE SUN SCREEN FOR AUTOMOBILE WINDOWS

[76] Inventor: Gregory A. Thomas, 5625 Adobe Falls Rd., B, San Diego, Calif. 92120

[21] Appl. No.: 718,632

[22] Filed: Jun. 21, 1991

[51] Int. Cl.$^5$ .............................................. B60J 3/00
[52] U.S. Cl. .................. 160/370.2; 160/120; 296/97.8
[58] Field of Search ............ 160/370.2, 262, 241, 160/120; 296/97.8

[56] References Cited

U.S. PATENT DOCUMENTS

| | | | |
|---|---|---|---|
| 2,594,813 | 4/1952 | Sieiert | 160/120 |
| 3,075,805 | 1/1963 | Golde et al. | 160/262 X |
| 4,758,041 | 7/1988 | Labeur | 296/97.8 X |
| 4,898,224 | 2/1990 | Woodworth | 296/97.8 X |
| 4,979,775 | 12/1990 | Klose | 160/370.2 X |
| 4,986,592 | 1/1991 | Kaiser et al. | 296/97.8 |

Primary Examiner—Blair M. Johnson
Attorney, Agent, or Firm—Frank D. Gilliam

[57] ABSTRACT

A sun screen for selectively covering automobile windows movable between a stowed position exposing a window and a deployed position covering at least part of a window. The sun screen can be sized to fit a variety of window shapes, including trapezoidal or other non-rectangular shapes. The translucent screen is rolled on rollers mounted above the window. The screen includes a central rectangular portion sized to conform to the largest rectangle making up the window. Individual angled screens, having band-like shapes, are mounted as needed at the ends of the central portion on angled rollers. The lower edge of the central portion is secured to a transverse rod or tube with the lower edges of the angled screens secured to tubes in a telescoping relationship to the transverse rod ends. The outer ends of the tubes are guided in a track for movement in a generally vertical direction along the window edges. A pulley system driven by an electrical motor causes the rod and tube assembly to move vertically along the tracks to the desired deployment. The screen system may be returned to the stowed position by rotating the rollers, either under control of the electrical motor or by means of a torsion spring in the roller. Thus, the screen when fully deployed covers the entire window, leaving no distracting "hot spots" of light entering along the edges or at corners.

20 Claims, 1 Drawing Sheet

DEPLOYABLE SUN SCREEN FOR AUTOMOBILE WINDOWS

BACKGROUND OF THE INVENTION

This invention relates in general to sun screens for absorbing a portion of the light entering an automobile window and more specifically, to a system for automatically moving a sun screen to cover automobile windows of trapezoidal or other non-rectangular shapes.

Since the earliest days of automobiles, discomfort and danger have been the lot of drivers driving towards a low, rising or setting, sun. Passengers also find the sun shining in through a side or rear window uncomfortable. Most automobiles include two hinged sun visors adjacent to the windshield which can be swung down over the upper part of the windshield and sometimes swung to the side to cover a portion of the front side windows. While better than nothing, these sun visors often have insufficient size or movability to intercept light from a very low sun. Since they absolutely block the passage of light, they can obstruct a driver's vision to the extent that other vehicles or the like are not seen.

In an attempt to overcome some of these problems with sun visors, sometimes windows are completely coated with a film of light absorbing material. However, since these sun screens cannot be removed, they are ordinarily illegal for use on windshields and front side windows, because the light absorbing characteristics are undesirable and dangerous at night or in low light conditions.

Attempts have been made to provide moveable sun screens which can be stowed away from the window and deployed over the window as conditions require. A number of mechanically complex window curtain raising and lowering systems were devised in the early days of automobiles, such as those disclosed by Ames in U.S. Pat. No. 1,798,577, Blancanrd in U.S. Pat. No. 1,977,844 and Courtwright in U.S. Pat. No. 2,023,666. Generally, these were intended to move a covering over a window opening and were only useful with rectangular openings.

Later, window shades of the type usually used in homes, having a shade wrapped roller with an internal torsion spring, so the shade could be deployed by pulling it down an latching it and stowed by releasing the latch and allowing the torsion spring to rewind the shade were applied to automobiles. Typical of these systems is that described by Merkl in U.S. Pat. No. 1,973,382 for use with the rear window of an automobile. Again, these were only suitable for use with rectangular windows, since otherwise considerable distracting light will leak around the shade edges.

More recently, a complex horizontally moveable light-blocking shade arrangement has been disclosed by Worrall in U.S. Pat. No. 4,874,026. This system, however, is intended only for use when the vehicle is parked to prevent sun damage to upholstery and the like. This system also is not readily useful with non-rectangular windows.

A window shade for use in the highly-sloped rear windows of modern automobiles is described by Woodworth in U.S. Pat. No. 4,898,224. A shade would on a roller is positioned below the window with a central pulley arrangement extending up over the center of the widow to pull the shade upwardly and forwardly along the window. This system does not seem adaptable to windshields because of the central deployment mechanism which would block a central area of the driver's forward view and the edges of the shade are spaced sufficiently from the window which would allow light leakage around the edges.

Thus, there is a continuing need for a simple and dependable deployable sun screen systems useful with windshields and other automobile windows which fully cover trapezoidal and other non-rectangular windows when deployed and which may be easily stowed out of the way of the vehicle occupants when not in use.

SUMMARY OF THE INVENTION

It is, therefore, an object of this invention to provide a deployable sun screen system of improved simplicity and reliability for use with automobile windows. Another object is to provide a sun screen system suitable for use with trapezoidal or other non-rectangular automobile windows. A further object is to provide a sun screen system that can be rapidly and conveniently moved from a stowed position to a selected degree of deployment and back to the stowed position without distracting the driver.

The above-noted objects, and others, are accomplished in accordance with this invention by a deployable sun screen system for automobiles which comprises (in the case of a trapezoidal window) a screen support assembly comprising a central rectangular sun screen wrapped around a roller positioned above the window, a plurality of angled narrow rollers at the ends of the central portion carrying angled, sun screen strips and a horizontal rod assembly comprising a central rod attached to the lower edge of the central portion and tubes attached to the screen strips and telescoped over the rod ends. A track along each window edge guides the ends of the tubes. A pulley system is arranged along the outside of each track. Each pulley system includes a small pulley at the top and bottom with an endless cable entrained over the pulleys. The ends of the tubes are secured to the cable for movement therewith. A motor drive system rotates the lower pulleys to move the screen vertically.

With the screen center portion and strips wrapped around the rollers and stowed above the window, the motor is activated to move the cable secured to the tubes downwardly. As the window widens, the tubes move outwardly along the track, causing the screen strips to angle away from the screen central portion. The motor can be stopped at any time, such as when only the upper portion of the window is desired to be covered. When full deployment is selected, a conventional limit switch is actuated by the rod or tubes when the window is fully covered. A conventional torsion spring, such as is used in conventional home window shades, is included in the rollers to maintain tension on the deployed screen.

When it is desired to return the screens to the stowed position, the motor is reversed, allowing the torsion spring to smoothly rewind the screen onto the rollers as the rod moves up the cable.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
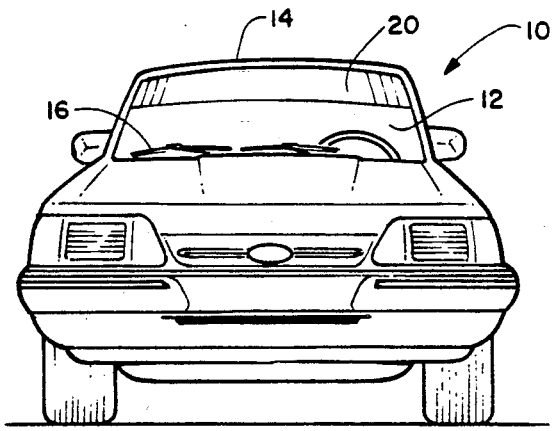
FIG. 1 is a schematic front elevation view of a conventional automobile with the sun screen of this invention partially deployed.

Referring now to FIG. 1, there seen a front view of a conventional automobile 10 having a windshield 12. Windshield 12, as is the case with windshields on most recent automobiles, is generally trapezoidal in shape, widening from the top 14 to the bottom 16.

Figure 2:
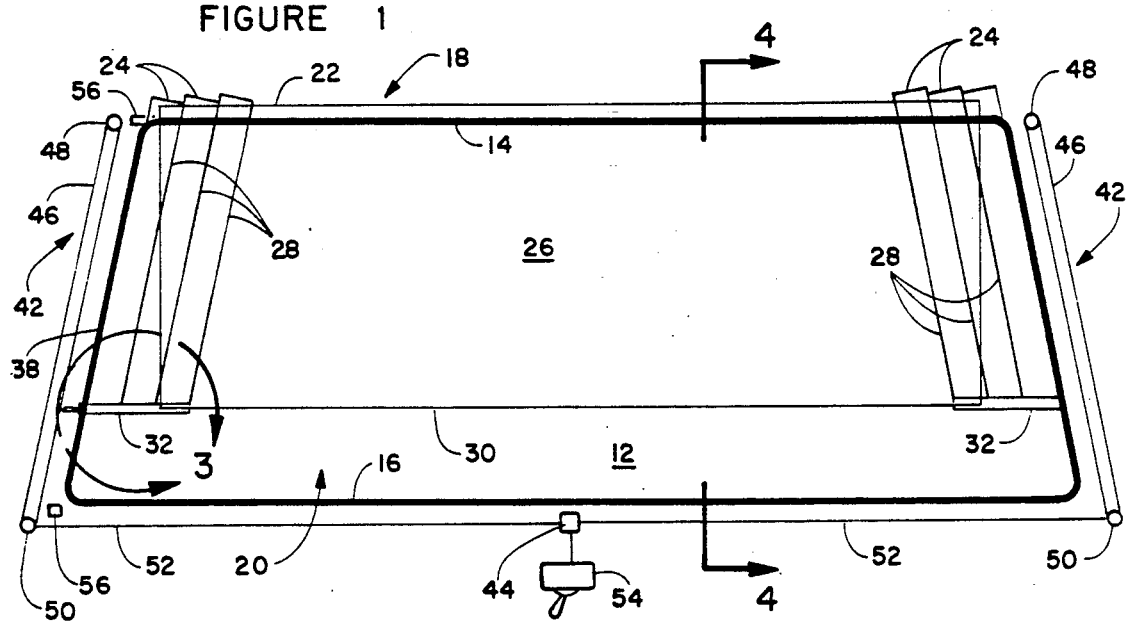
FIG. 2 is a schematic elevation view of an automobile window as seen from within the automobile.

A roller set 18 (as seen in FIG. 2) is mounted inside automobile 10 just above the top edge 14. As is detailed below, a set of panels making up sun screen 20 are rolled around roller set 18 when stowed and can be drawn down over windshield 12. As seen in FIG. 1, sun screen 20 is about half way down. While ordinarily the sun screen will be used in the fully deployed position fully covering windshield 12, if desired it can be left partially deployed; such as when the sun is relatively high and appears to the driver to be just below the upper edge 14 of windshield 12.

Figure 3:
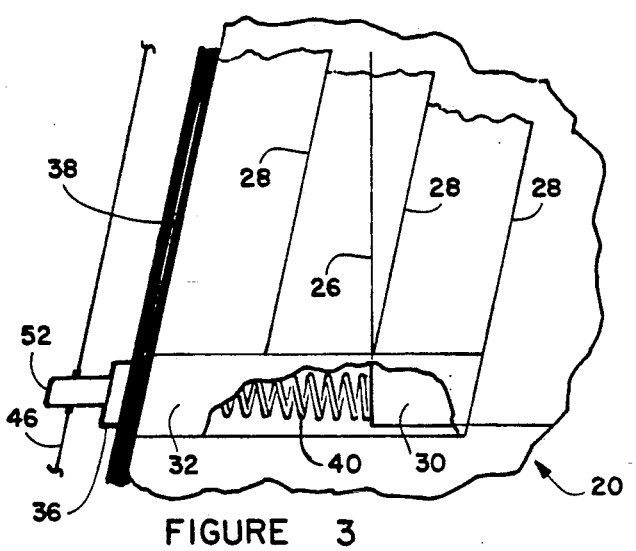
FIG. 3 is a detail view, partially cut-away, taken at 3—3 in FIG. 2.
Figure 4:
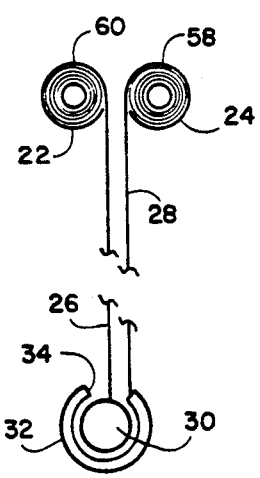
FIG. 4 is a schematic section view, taken on line 4—4 in FIG. 2.

Details of the set of panels making up sun screen 20, the rollers making up roller set 18 and the sun screen actuation system are detailed in FIGS. 2-4. Roller set 18 includes a central roller 22 and a plurality of short angled rollers 24 at one or both ends. The number and angle of rollers 24 will be selected in accordance with the configuration of windshield 12. Where the sides of the windshield angle out to a greater degree, more rollers 24 positioned at a greater angle to central roller 22 would be used. Where, as is usual with front side windows, one end of the window is vertical and one is angled, angled rollers 24 would only be used on the angled window end. All of rollers 22 and 24 are mounted on thin metal brackets of the sort used with conventional home window shades, which are not shown, for clarity.

Central roller 22 has a rectangular central screen 26, generally a sheet of suitable translucent material, wrapped therearound. Central screen 26 has a width substantially equal to the width of the top edge 14 of windshield 12 and a length sufficient to reach past the bottom edge 16 of the windshield.

Each of the angled rollers 24 has rolled thereon a band-like angled screen 28 of material generally identical to the material of central screen 26. The angled screens have sufficient length to reach beyond bottom edge 16 of windshield 12 and widths selected to at least slightly overlap each other and central screen 26 when fully deployed.

The lower edge of central screen 26 is secured to a transverse rod or thin tube 30. Typically, rod 30 is a thin piano wire rod inserted in a narrow hem at the bottom edge of central screen 26.

The bottom edges of angled screens 28 on each side of central screen 26 are secured to tubes 32 which telescope over the ends of rod 30. A slot 34 (FIG. 4) is provided in the upper portion of each tube 27 into which the edge of central screen 26 can move as the assembly of rod 30 and tubes 32 moves upwardly as the screen assembly 20 moves toward the rolled-up, stowed position.

The outer ends 36 of tubes engage and ride along a track 38 that parallels the edge of windshield 12, as best shown in FIG. 3. Typically, the track may have a slot that engages grooves in the sides of tube 32 in a conventional manner, or any other suitable track follower system. A compression spring 40 may be included in each tube 32 between tube end 36 and the end of rod 30 to aid in keeping the rod centered during deployment and retraction. Where angled rollers 24 are provided on only one side of central screen 26, such as in the case of front side windows, which have an angled front edge and a substantially vertical rear edge, the end of rod 30 will engage track 38 on the vertical window side.

Thus, as the assembly of rod 30 and tubes 32 moves up and down across windshield 12, all of the windshield above the rod and tubes will be covered with screen material, preventing any distracting and annoying "hot spots" of sun leaking through edges. Where angled screens 28 overlap each other or central screen 26 there will be slightly darker areas. These are hardly noticed, being near the edges of the windshield and are far less distracting that openings where full sunlight could shine through.

The system is operated by a pulley system 42 along each track with a single electrical drive motor 44 centrally located below windshield 12. Each pulley assembly 42 includes an endless cable 46 entrained around an upper pulley 48 and a lower pulley 50. Cable 46 is secured to an extension 52 on each tube end 36, such as by a conventional slot and set screw arrangement (not shown). Lower pulleys 50 are rotated simultaneously by drive motor 44 through drive lines 52, which may be any suitable means such as a cable similar to a conventional speedometer cable rotating in a tube.

Typically, a conventional three-way switch schematically indicated at 54 is manually operated by the driver to rotate drive motor in selectively in either direction, to stow or deploy the sun screen assembly 20. The driver may turn off the switch with the sun screen partially deployed (as shown in FIG. 1) if desired. Or, the switch can be left "on" in one direction or the other and conventional limit switches, schematically indicated at 56, will be contacted by projection 52 on tube end 36 to stop drive motor 44 when the system reaches the fully deployed or fully stowed position.

Torsion springs 58 and 60 of the conventional type used in home window shades, are included within angled rollers 24 and central roller 22 to provide tension to assist in moving the screens to the stowed position. Preferably, rollers 22 and 24 are located on the opposite sides of the plane of screens 26 and 28 as seen in FIG. 4 to provide more room for the roller mounting brackets.

Thus, it can be seen that the sun screen system of this system is simple and easily installed and operated, is adaptable to many windshield and window configurations and avoids any light leaks at window edges or corners. Other applications, variations and ramifications of this invention will occur to those skilled in the art upon reading this disclosure. Those are intended to be included within the scope of this invention, as defined in the appended claims.

I claim:

1. A sun screen assembly adapted to selectively cover the entire surface of non-rectangular automobile windows which comprises:
    a central roller adapted to be mounted above the central portion of an automobile window;
    a plurality of angled rollers adapted to be positioned adjacent to at least one end of said central roller at an angle thereto the angle of said angled rollers corresponding to the angle of selected window side edge configuration;

sheets of sun screen material wrapped around each of said central and angled rollers when in the stowed position;

rod means secured to the lower edge of the central screen on said central roller;

extensible means secured to the lower edges of the angled screens on said angled rollers and extending from the ends of said rod means;

track means adapted to be positioned along the sides of said window operatively connected to said extensible means to cause the ends of said tube means to follow said track; and drive means for selectively moving said extensible means and rod upwardly and downwardly along said track;

whereby said sun screen material can be selectively moved between a stowed position rolled on said angled and central rollers and a selected deployed position covering at least a portion of said window and preventing all light leaks when covering the entire window.

2. The sun screen assembly according to claim 1 wherein said assembly is adapted to cover a trapezoidal window and includes a plurality of angled rollers at each side of said central roller.

3. The sun screen assembly according to claim 1 wherein said assembly is adapted to cover a window having one substantially vertical edge and one outwardly extending lower edge and includes a plurality of angled rollers at the outwardly extending window edge only.

4. The sun screen assembly according to claim 1 wherein said extensible means each includes a tube telescoping over an end of said rod and having a tube end engaging said track for movement therealong.

5. The sun screen assembly according to claim 4 wherein said extensible means further includes a slot in the portion of said tube extending over said rod, said slot adapted to pass by the edge portion of said central screen.

6. The sun screen assembly according to claim 4 further including a compression spring within said tube and bearing on the end of said rod and said tube end to bias said end toward said track.

7. The sun screen assembly according to claim 4 wherein said drive means comprises a pulley system having a cable attached to said tube end means to move said cable to move said tube ends along said track.

8. The sun screen assembly according to claim 7 wherein said pulley system includes pulleys adapted to be located adjacent to the upper and lower ends of window side edges and said cable is an endless cable entrained around each pair of upper and lower pulleys.

9. The sun screen assembly according to claim 8 further including torsion spring means within said rollers adapted to bias said rollers toward the stowed position and electric motor means for driving at least one pulley of each pair of upper and lower pulleys to move said tubes and rod toward the deployed position.

10. The sun screen assembly according to claim 9 wherein said electrical motor means comprises a single electrical motor adapted to be positioned below the lower edge of a window and including drive lines between said motor and each lower pulley.

11. The sun screen assembly according to claim 10 further including switch means to selectively operate said motor to move said sun screens toward the stowed or deployed positions a selected distance.

12. The sun screen assembly according to claim 11 further including limit switches to automatically stop said motor when said sun screens reach the fully deployed or fully stowed positions.

13. A sunscreen assembly adapted to selectively cover the entire surface of non-rectangular automobile windows which comprises:

a central roller adapted to be mounted above the central portion of an automobile window;

a plurality of angled rollers positioned adjacent to at least one end of said central roller at an angle thereto the angle of said angled rollers corresponding to the angle of the adjacent window side edge;

sheets of sun screen material wrapped around each of said central and angled rollers when in the stowed position;

rod means secured to the lower edge of the central screen on said central roller;

extensible tube means secured to the lower edges of the angled screens on said angled rollers and extending from the ends of said rod means;

track means along the sides of said window operatively connected to said tube means to cause the ends of said tube means to follow said track;

a pulley assembly connected to the ends of said tube means to move said tubes and rod means along said track; and drive means for selectively causing said pulley assembly to move said tubes and rod means;

whereby said sun screen material can be selectively moved between a stowed position rolled on said angled and central rollers and a selected deployed position covering at least a portion of said window and preventing all light leaks when covering the entire window.

14. The sun screen assembly according to claim 13 wherein said assembly is adapted to cover a trapezoidal window and includes a plurality of angled rollers at each side of said central roller.

15. The sun screen assembly according to claim 13 wherein said assembly is adapted to cover a window having one substantially vertical edge and one outwardly extending lower edge and includes a plurality of angled rollers at the outwardly extending edge only.

16. The sun screen assembly according to claim 15 wherein said extensible means further includes a slot in the portion of said tube extending over said rod, said slot adapted to pass by the edge portion of said central screen.

17. The sun screen assembly according to claim 15 further including a compression spring within said tube and bearing on the end of said rod and said tube end to bias said end toward said track.

18. The sun screen assembly according to claim 13 wherein said drive system includes an endless cable entrained around pulleys adapted to be located adjacent to the upper and lower ends of window side edges, said cable attached to said tube end so that said tube end moves along said track with said cable.

19. The sun screen assembly according to claim 13 wherein said drive system includes torsion spring means within said rollers adapted to bias said rollers toward the stowed position and an electrical motor adapted to drive said pulleys through drive lines between said motor and said pulleys.

20. The sun screen assembly according to claim 19 wherein said drive system further includes switch means manually operable to cause said motor to selectively drive said sun screen toward the stowed or the deployed position a selected distance and further includes limit switches to automatically stop said motor when said sun screen reaches the fully deployed or fully stowed position.

* * * * *